(12) United States Patent
Hodge

(10) Patent No.: US 12,052,209 B2
(45) Date of Patent: Jul. 30, 2024

(54) SECURE FORUM FACILITATOR IN CONTROLLED ENVIRONMENT

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 18/127,810

(22) Filed: Mar. 29, 2023

(65) Prior Publication Data
US 2023/0319000 A1 Oct. 5, 2023

Related U.S. Application Data

(63) Continuation of application No. 17/839,677, filed on Jun. 14, 2022, now Pat. No. 11,621,934, which is a
(Continued)

(51) Int. Cl.
*H04L 51/212* (2022.01)
*G06Q 50/00* (2012.01)
(Continued)

(52) U.S. Cl.
CPC ........... *H04L 51/212* (2022.05); *G06Q 50/01* (2013.01); *H04L 51/52* (2022.05); *H04L 63/08* (2013.01);
(Continued)

(58) Field of Classification Search
CPC ....... H04L 51/212; H04L 51/52; H04L 63/08; H04L 63/102; H04L 63/104; H04L 63/20;
(Continued)

(56) References Cited

U.S. PATENT DOCUMENTS

| | | | |
|---|---|---|---|
| 7,564,840 B2 * | 7/2009 | Elliott | ................. H04L 65/1106 370/522 |
| 7,664,689 B1 | 2/2010 | Rosenfield et al. | |

(Continued)

OTHER PUBLICATIONS

Franz Wanner, Thomas Ramm, and Daniel A. Keim. 2011. ForAVis: explorative user forum analysis. In Proceedings of the International Conference on Web Intelligence, Mining and Semantics (WIMS '11). Association for Computing Machinery, New York, NY, USA, Article 14, 1-10. (Year: 2011).*
(Continued)

*Primary Examiner* — Melvin H Pollack
(74) *Attorney, Agent, or Firm* — Sterne, Kessler, Goldstein & Fox P.L.L.C.

(57) ABSTRACT

An forum facilitator device is provided that allows for a controlled environment to provide a secure forum for residents to provide communications to other registered users of the secure forum. The communications are provided through posts made in the secure forum and through other types of communications from the inmate such as but not limited to emails and text messages. The forum facilitator device operates the secure forum and implements rules to control what is posted on the secure forum, who is able to access the secure forum, and what entities are allowed to view and interact with residents of the controlled environment.

20 Claims, 5 Drawing Sheets

Related U.S. Application Data continuation of application No. 17/397,552, filed on Aug. 9, 2021, now Pat. No. 11,362,976, which is a continuation of application No. 16/828,687, filed on Mar. 24, 2020, now Pat. No. 11,088,978, which is a continuation of application No. 16/155,322, filed on Oct. 9, 2018, now Pat. No. 10,601,750, which is a continuation of application No. 15/694,406, filed on Sep. 1, 2017, now Pat. No. 10,097,490.

(51) Int. Cl.
*G06Q 50/26* (2012.01)
*H04L 9/40* (2022.01)
*H04L 51/52* (2022.01)
*H04L 67/104* (2022.01)

(52) U.S. Cl.
CPC .......... *H04L 63/102* (2013.01); *H04L 63/104* (2013.01); *H04L 63/20* (2013.01); *H04L 63/302* (2013.01); *H04L 67/1046* (2013.01); *G06Q 50/26* (2013.01)

(58) Field of Classification Search
CPC ... H04L 63/302; H04L 67/1046; G06Q 50/01; G06Q 50/26
USPC .......................................................... 709/206
See application file for complete search history.

(56) References Cited

U.S. PATENT DOCUMENTS

| | | | |
|---|---|---|---|
| 7,813,939 B2 | 10/2010 | Clements et al. | |
| 8,064,434 B2 | 11/2011 | Golobrodsky et al. | |
| 8,285,578 B2* | 10/2012 | Sheppard | G06Q 10/00 |
| | | | 705/7.27 |
| 9,014,355 B2 | 4/2015 | Heaton et al. | |
| 9,055,167 B1 | 6/2015 | Keiser et al. | |
| 9,306,979 B2 | 4/2016 | Erickson et al. | |
| 9,311,627 B1 | 4/2016 | Shipman, Jr. et al. | |
| 9,357,247 B2 | 5/2016 | Cronk et al. | |
| 9,363,159 B2* | 6/2016 | Pugaczewski | H04L 12/4641 |
| 9,367,822 B2* | 6/2016 | Shipon | G06Q 10/00 |
| 9,389,877 B2 | 7/2016 | Galicia et al. | |
| 9,444,848 B2 | 9/2016 | Green et al. | |
| 9,465,795 B2 | 10/2016 | Gannu et al. | |
| 9,479,651 B1 | 10/2016 | Walker-Muraguri et al. | |
| 9,485,206 B2 | 11/2016 | Day, II et al. | |
| 9,491,291 B1 | 11/2016 | Apple et al. | |
| 9,497,263 B2 | 11/2016 | Chakravarthy et al. | |
| 9,521,013 B2 | 12/2016 | Lindsay et al. | |
| 9,521,252 B2 | 12/2016 | Leeds et al. | |
| 9,535,675 B2 | 1/2017 | Mohamad Abdul et al. | |
| 9,569,729 B1 | 2/2017 | Oehrle et al. | |
| 9,596,366 B1 | 3/2017 | Smith et al. | |
| 9,621,504 B2 | 4/2017 | Torgersrud et al. | |
| 9,628,756 B2 | 4/2017 | Edwards | |
| 9,654,620 B2 | 5/2017 | Rae et al. | |
| 9,667,763 B1 | 5/2017 | Keiser et al. | |
| 9,680,903 B1 | 6/2017 | Keiser et al. | |
| 9,681,360 B1 | 6/2017 | Salyers et al. | |
| 9,686,356 B2 | 6/2017 | Raduchel | |
| 9,692,718 B2 | 6/2017 | Bennett | |
| 9,699,157 B2 | 7/2017 | Torgersrud | |
| 9,712,510 B2* | 7/2017 | Vinnik | H04L 63/08 |
| 9,723,040 B1 | 8/2017 | Lubbehusen et al. | |
| 9,736,100 B2* | 8/2017 | Kaplinger | H04L 51/52 |
| 9,742,910 B2 | 8/2017 | Keiser et al. | |
| 9,746,985 B1 | 8/2017 | Humayun et al. | |
| 9,749,311 B2 | 8/2017 | Jayanti Venkata et al. | |
| 9,769,666 B2 | 9/2017 | Salyers et al. | |
| 9,785,758 B1 | 10/2017 | Enright et al. | |
| 9,807,059 B2* | 10/2017 | Ståhl | H04L 65/611 |
| 9,813,407 B2 | 11/2017 | Mohamad Abdul et al. | |
| 9,813,551 B2 | 11/2017 | Gainsboro et al. | |
| 9,817,922 B2 | 11/2017 | Glunz et al. | |
| 9,819,756 B1 | 11/2017 | Welker-Muraguri et al. | |
| 9,820,150 B2 | 11/2017 | Salyers et al. | |
| 9,826,003 B1 | 11/2017 | Thomasson et al. | |
| 9,832,233 B2 | 11/2017 | Torgersrud et al. | |
| 9,832,313 B1 | 11/2017 | Way et al. | |
| 9,842,218 B1* | 12/2017 | Brisebois | H04L 63/101 |
| 9,865,016 B2 | 1/2018 | Joshi et al. | |
| 9,961,114 B2 | 5/2018 | Srikanth et al. | |
| 9,965,133 B1 | 5/2018 | Lindsey et al. | |
| 9,965,746 B1 | 5/2018 | Keiser et al. | |
| 10,013,694 B1 | 7/2018 | Israeli et al. | |
| 10,033,702 B2 | 7/2018 | Ford et al. | |
| 10,052,026 B1 | 8/2018 | Tran | |
| 10,057,256 B1 | 8/2018 | Talbot | |
| 10,057,398 B2 | 8/2018 | Hodge et al. | |
| 10,069,966 B2 | 9/2018 | Gainsboro et al. | |
| 10,078,739 B1 | 9/2018 | Higgs et al. | |
| 10,084,872 B2* | 9/2018 | Bradley | H04L 67/306 |
| 10,095,509 B2 | 10/2018 | Xia et al. | |
| 10,097,490 B2 | 10/2018 | Hodge | |
| 10,097,557 B2* | 10/2018 | Armer | H04L 67/10 |
| 10,115,080 B2 | 10/2018 | Martinez et al. | |
| 10,116,676 B2 | 10/2018 | Roosenraad et al. | |
| 10,117,073 B1* | 10/2018 | Dannamaneni | H04W 4/023 |
| 10,126,927 B1 | 11/2018 | Fieldman | |
| 10,129,569 B2 | 11/2018 | Ortiz et al. | |
| 10,133,825 B2* | 11/2018 | Buehler | G06F 16/954 |
| 10,135,836 B2 | 11/2018 | Chan et al. | |
| 10,165,073 B1* | 12/2018 | Parampottil | G06Q 50/01 |
| 10,171,397 B2* | 1/2019 | Della Corte | H04L 51/214 |
| 10,171,577 B2* | 1/2019 | Alhandy | G06Q 50/01 |
| 10,185,670 B2* | 1/2019 | Litichever | G06F 21/82 |
| 10,193,864 B2* | 1/2019 | Toy | H04L 63/0272 |
| 10,217,117 B2* | 2/2019 | Heath | G06Q 30/0241 |
| 10,218,842 B2 | 2/2019 | Hodge et al. | |
| 10,223,440 B2 | 3/2019 | Goldberg et al. | |
| 10,237,280 B2 | 3/2019 | Day, II et al. | |
| 10,250,630 B2 | 4/2019 | Singuru | |
| 10,257,151 B2 | 4/2019 | Morrison et al. | |
| 10,270,906 B1 | 4/2019 | Keiser et al. | |
| 10,275,811 B2 | 4/2019 | Collins | |
| 10,296,751 B2 | 5/2019 | Boudreau et al. | |
| 10,313,760 B2 | 6/2019 | Glennon et al. | |
| 10,380,228 B2 | 8/2019 | Lee | |
| 10,394,871 B2 | 8/2019 | Galia et al. | |
| 10,394,900 B1 | 8/2019 | Edwards | |
| 10,417,613 B1* | 9/2019 | Brisebois | G06F 21/554 |
| 10,440,134 B1* | 10/2019 | Trachtenberg | G06F 21/10 |
| 10,452,337 B1 | 10/2019 | Clements et al. | |
| 10,496,061 B2 | 12/2019 | Strohmenger et al. | |
| 10,523,769 B2 | 12/2019 | Balasubramanian et al. | |
| 10,540,644 B1 | 1/2020 | Walker et al. | |
| 10,540,906 B1 | 1/2020 | Fieldman | |
| 10,592,520 B2 | 3/2020 | Klaus et al. | |
| 10,593,426 B2 | 3/2020 | Amarasingham et al. | |
| 10,601,750 B2 | 3/2020 | Hodge | |
| 10,601,776 B1* | 3/2020 | Burakovsky | H04L 63/0218 |
| 10,607,301 B2* | 3/2020 | Dareshani | G06Q 50/01 |
| 10,621,535 B1 | 4/2020 | Lawrence | |
| 10,635,746 B2* | 4/2020 | Kong | H04L 51/42 |
| 10,656,607 B2 | 5/2020 | Patel et al. | |
| 10,693,669 B2* | 6/2020 | Dave | H04N 7/157 |
| 10,699,351 B1 | 6/2020 | Miller et al. | |
| 10,757,265 B2 | 8/2020 | Seyfetdinov | |
| 10,789,602 B2 | 9/2020 | Levy et al. | |
| 10,853,898 B1 | 12/2020 | Lawrence | |
| 10,904,296 B1* | 1/2021 | Mathew | H04L 63/302 |
| 11,037,675 B1 | 6/2021 | Pickens | |
| 11,088,978 B2 | 8/2021 | Hodge | |
| 11,113,347 B2* | 9/2021 | Zheng | G06F 16/958 |
| 11,222,298 B2 | 1/2022 | Abelow | |
| 11,323,571 B1 | 5/2022 | Johnston, Jr. | |
| 11,362,976 B2 | 6/2022 | Hodge | |
| 11,630,708 B2* | 4/2023 | Ron | G06Q 10/101 |
| | | | 715/753 |
| 2003/0023459 A1* | 1/2003 | Shipon | G16Z 99/00 |
| | | | 705/2 |
| 2010/0005099 A1 | 1/2010 | Goodman et al. | |

(56) References Cited

U.S. PATENT DOCUMENTS

| | | |
|---|---|---|
| 2010/0159879 A1 | 6/2010 | Salkini et al. |
| 2010/0318441 A1 | 12/2010 | Harper |
| 2011/0213618 A1 | 9/2011 | Hodge et al. |
| 2012/0042266 A1 | 2/2012 | Sotropa |
| 2012/0189110 A1 | 7/2012 | Bullard et al. |
| 2012/0296807 A1 | 11/2012 | Polozola et al. |
| 2013/0012205 A1 | 1/2013 | Noonan et al. |
| 2013/0226678 A1 | 8/2013 | Perna |
| 2014/0006148 A1 | 1/2014 | Perna |
| 2014/0218466 A1 | 8/2014 | Bloms et al. |
| 2014/0247926 A1 | 9/2014 | Gainsboro et al. |
| 2015/0012339 A1 | 1/2015 | Onischuk |
| 2015/0154721 A1 | 6/2015 | Thompson |
| 2015/0188925 A1 | 7/2015 | Gupta |
| 2015/0213217 A1 | 7/2015 | Amarasingham et al. |
| 2015/0269639 A1* | 9/2015 | Mistriel ............ G06Q 50/01 705/319 |
| 2015/0271557 A1 | 9/2015 | Tabe |
| 2015/0278462 A1 | 10/2015 | Smoley et al. |
| 2016/0012465 A1 | 1/2016 | Sharp |
| 2016/0042651 A1 | 2/2016 | Joao |
| 2016/0110523 A1 | 4/2016 | Francois |
| 2016/0117466 A1 | 4/2016 | Singh |
| 2016/0191850 A1 | 6/2016 | Humphries |
| 2016/0210427 A1 | 7/2016 | Mynhier et al. |
| 2016/0239932 A1 | 8/2016 | Sidler et al. |
| 2016/0246936 A1 | 8/2016 | Kahn |
| 2016/0307097 A1 | 10/2016 | Lu et al. |
| 2016/0373461 A1 | 12/2016 | Hanna et al. |
| 2017/0103180 A1 | 4/2017 | Jiao et al. |
| 2017/0124276 A1 | 5/2017 | Tee |
| 2017/0132735 A1 | 5/2017 | Smair et al. |
| 2017/0134468 A1 | 5/2017 | Torgersrud et al. |
| 2017/0142368 A1 | 5/2017 | Smith et al. |
| 2017/0147996 A1 | 5/2017 | Kirley |
| 2017/0178162 A1 | 6/2017 | Duggal et al. |
| 2017/0187869 A1 | 6/2017 | Higgs |
| 2017/0188250 A1 | 6/2017 | Stevens et al. |
| 2017/0195494 A1 | 7/2017 | Bengston et al. |
| 2017/0220641 A1 | 8/2017 | Chi et al. |
| 2017/0230387 A1 | 8/2017 | Srinivasan et al. |
| 2017/0257362 A1 | 9/2017 | Maheshwari et al. |
| 2017/0262604 A1 | 9/2017 | Francois |
| 2017/0264739 A1 | 9/2017 | Smith |
| 2017/0295279 A1 | 10/2017 | Rokosky et al. |
| 2017/0302613 A1 | 10/2017 | Imbrie |
| 2017/0302885 A1 | 10/2017 | Edwards |
| 2017/0322682 A1 | 11/2017 | Humayun et al. |
| 2017/0325096 A1 | 11/2017 | Torgersrud et al. |
| 2017/0344748 A1 | 11/2017 | Ghani et al. |
| 2017/0345248 A1 | 11/2017 | Peters et al. |
| 2017/0346851 A1 | 11/2017 | Drake |
| 2017/0353423 A1 | 12/2017 | Morrison et al. |
| 2018/0027006 A1 | 1/2018 | Zimmermann et al. |
| 2018/0152539 A1 | 5/2018 | Bastide et al. |
| 2018/0196876 A1* | 7/2018 | Abou Mahmoud ............ G06F 16/9535 |
| 2018/0294986 A1 | 10/2018 | Vidro et al. |
| 2018/0352077 A1 | 12/2018 | Chang et al. |
| 2019/0042557 A1 | 2/2019 | Okubo et al. |
| 2019/0044744 A1 | 2/2019 | Yagnik |
| 2019/0052676 A1 | 2/2019 | Giokas |
| 2019/0058712 A1 | 2/2019 | Jones |
| 2019/0072979 A1 | 3/2019 | Sukhomlinov et al. |
| 2019/0149500 A1 | 5/2019 | Hodge |
| 2019/0173813 A1 | 6/2019 | Adam et al. |
| 2019/0189021 A1 | 6/2019 | Clarke et al. |
| 2019/0199673 A1 | 6/2019 | Moffat |
| 2019/0208166 A1 | 7/2019 | Talbot |
| 2020/0258178 A1 | 8/2020 | Keiser et al. |
| 2020/0275056 A1 | 8/2020 | Smith |
| 2020/0296063 A1 | 9/2020 | Hodge |
| 2020/0351292 A1* | 11/2020 | Sander ............ H04L 63/1433 |
| 2022/0078145 A1 | 3/2022 | Hodge |
| 2022/0385610 A1 | 12/2022 | Hodge |

OTHER PUBLICATIONS

Holt, Thomas and Bolden, Michah-Sage. "Technological Skills of White Supremacists in an Online Forum: A Qualitative Examination," Intl Journal of Cyber Criminology, vol. 8, Issue 2, Jul.-Dec. 2014, pp. 79-93. (Year: 2014).*

International Search Report and Written Opinion of the International Searching Authority directed to related International Patent Application No. PCT/US2018/049219, dated Oct. 11, 2018; 6 pages.

International Preliminary Report on Patentability directed to related International Patent Application No. PCT/US2018/049219, dated Mar. 3, 2020; 4 pages.

Almost, J., Gifford, W.A., Doran, D. et al. Correctional nursing: a study protocol to develop an educational intervention to optimize nursing practice in a unique context. Implementation Sci 8, 71 (2013). https://doi.org/10.1186/1748-5908-8-71 (Year: 2013).

Jewkes, Y., & Reisdorf, B. C. (2016). A Brave New World: the problems and opportunities presented by new media technologies in prisons. Criminology and Criminal Justice, 16(5), 534-551. https://doi.org/10.1177/17 48895816654953 (Year: 2016).

Pike, A., & Adams, A. (2012). Digital exclusion or learning exclusion? An ethnographic study of adult male distance learners in English prisons. Research in Learning Technology, 20. https://doi.org/10.3402/rlt.v2010.18620 (Year: 2012).

* cited by examiner

SECURE FORUM FACILITATOR IN CONTROLLED ENVIRONMENT

CROSS REFERENCE TO RELATED APPLICATION

This application a continuation of U.S. Nonprovisional patent application Ser. No. 17/839,677, filed Jun. 14, 2022, now U.S. Pat. No. 11,621,934 titled "Secure Forum Facilitator in a Controlled Environment," which is a continuation of U.S. Nonprovisional patent application Ser. No. 17/397,552, filed Aug. 9, 2021, now U.S. Pat. No. 11,362,976 titled "Secure Forum Facilitator in a Controlled Environment," which is a continuation of U.S. Nonprovisional patent application Ser. No. 16/828,687, filed Mar. 24, 2020, now U.S. Pat. No. 11,088,978 titled "Secure Forum Facilitator in Controlled Environment," which is a continuation of U.S. Nonprovisional patent application Ser. No. 16/155,322, filed Oct. 9, 2018, now U.S. Pat. No. 10,601,750 titled "Secure Forum Facilitator in Controlled Environment," which is a continuation of U.S. Nonprovisional patent application Ser. No. 15/694,406, filed Sep. 1, 2017, now U.S. Pat. No. 10,097,490, titled "Secure Forum Facilitator in Controlled Environment," the contents of which are hereby incorporated herein by reference in their entireties.

BACKGROUND

Field

This disclosure relates to a forum facilitator device for providing communication and forum based services to persons housed in controlled environments.

Background

Persons housed in a controlled environment are typically not allowed access to social media or social media type services such as forums due to security concerns or other restrictions associated with the controlled environment. Providing social media or social networking services to residents in a controlled environment present challenges with regard to which residents are allowed to access such services, controlling the actions taken by residents when allowed access to such services, and restricting persons with and to whom residents are allowed to communicate. These challenges are in contrast to telephone calls, text messages, or emails which are directed to specific contacts (e.g., telephone numbers, email addresses) and which can be screened and blocked based on the contacts to which these communications are sent. Social networking or forums allow users to post communications and anyone registered parties are allowed to view and otherwise post communications in response. Controlled environments therefore are typically unable to control or monitor such interactions and communications that take place over social networking or forums.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
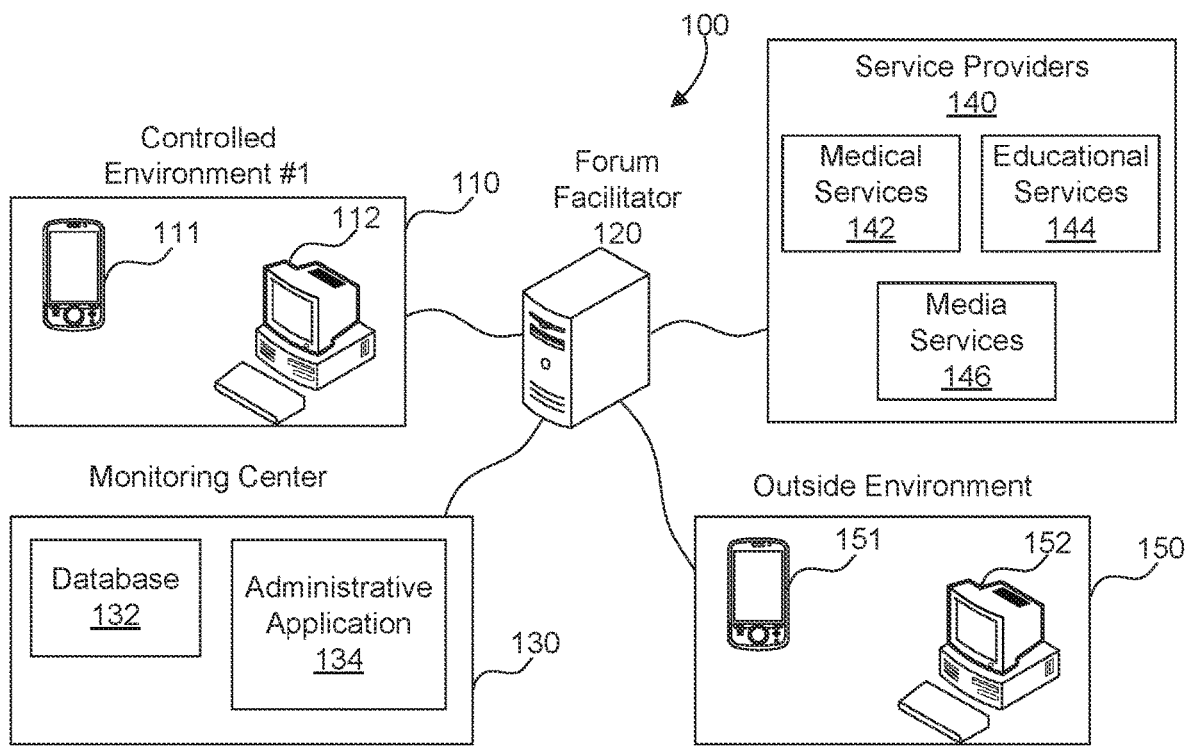
FIG. 1 illustrates a block diagram of an exemplary secure forum system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Accordingly, there is a need for controlled environments to provide a secure manner for its residents to participate over a social networking site such as a secure forum. The present disclosure provides a forum facilitator device that allows controlled environments to grant its residents access to a social networking site while maintaining control over what is posted, who is allowed to access the site, and what services can be provided over the site. The forum facilitator device solves the problem of protecting the public interest in regulating and monitoring actions of controlled environment residents while also allowing the residents an outlet to seek advice, help, and other methods to prepare themselves for life outside of the controlled environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Secure Forum System

FIG. 1 illustrates a block diagram of an exemplary secure forum system 100, according to embodiments of the present disclosure. Secure forum system 100 includes a controlled environment 110, monitoring center 130, a forum facilitator 120, service providers 140, and outside environment 150. In some embodiments, although FIG. 1 only depicts one controlled environment 110, secure forum system 100 may include more than one controlled environment that are linked through forum facilitator 120. Controlled environment 110 includes computing devices providing internet access (e.g., to the secure forum) to residents of controlled environment 110 such as a mobile device 111 or a kiosk 112. In some embodiments, mobile device 111 is implemented as a smartphone and kiosk 112 is implemented as a desktop computer. In some embodiments, other types of computing devices are within the scope of the invention such as tablets, laptops, and wearable devices and controlled environment 110 includes more than the two devices depicted in FIG. 1.

In some embodiments, controlled environment 110 is connected to monitoring center 130, service providers 140, and outside environment 150 through forum facilitator 120. Connections to forum facilitator 120 are over a network and include both wireless connections, such as cellular (e.g., GSM, CDMA), Bluetooth™ or IEEE 802.11 (commonly known as Wi-Fi), or wired connections. Forum facilitator 120 is a device that facilitates secure communications to and from controlled environment 110 to ensure that communications posted from and viewed by residents of controlled environment 110 comply with strict rules to prevent any nefarious or malicious content from being made available to be viewed. Forum facilitator 120 also allows controlled environment 110 to proactively provide specific services to its residents based on posted communications in the secure forum.

In some embodiments, forum facilitator 120 includes components for establishing secure forums and secure sub-forums within each forum for each controlled environment 110 that is connected to forum facilitator 120. Sub-forums are specialized forums within each secure forum that are formed based on at least one parameter such as but not limited to a specific topic or a specific group of registered users. In other words, a forum may be considered to be a generic and public forum available to registered users within controlled environment where a sub-forum is more specific and a private forum available to only those registered users who have been allowed to join the sub-forum. Forum facilitator 120 is responsible for managing the forums and sub-forums as well as determining what communications can be posted, what users are allowed to register or access sub-forums, which users, including residents of controlled environment 110 and outsiders of controlled environment 110, at outside environment 150, are allowed to communicate with each other. In some embodiments, an outsider is a person who is not a resident of controlled environment 110. In some embodiments, forums are identified by a forum identifier and sub-forums are identified by a sub-forum identifier. These identifiers are included in requests and posts to identify the forum and/or sub-forum in which a communication is to be posted. Forum facilitator 120 uses identifiers to in order to main the security of the system because not all users in secure forum system 100 are allowed to communicate with each other. Accordingly, it is important to ensure that communications are posted to the appropriate forums and sub-forums.

In some embodiments, forum facilitator 120 performs its functions by implementing rules provided by controlled environment 110 that are associated with its residents as well as what is allowed to be posted on any forum or sub-forum. There are rules specific to (and provided by) controlled environments and rules specific to registered users of secure forum system 100 (e.g., user rules). Different controlled environments would have different rules based on the different residents that are located in each controlled environment. Accordingly, in embodiments where more than one controlled environment are linked to forum facilitator 120, there would be more than one set of environment rules implemented by forum facilitator 120

Rules specified by controlled environment 110 relate to permissible and/or restricted actions involving the forum including but not limited to which residents are allowed access to the forum or sub-forum, the extent of their privileges (e.g., may or may not join a sub-forum), a blacklist of contacts with whom communications are prohibited, and a whitelist of contacts with whom communications are allowed. In some embodiments, users (e.g., residents of controlled environment 110 and outsiders) will have specific user rules associated with permissible and restricted actions that can be performed within secure forum system 100 such as the blacklist and whitelist features discussed above. In some embodiments, user rules are stored in a user profile that includes an identifier that uniquely identifies the user within secure forum system. To ensure the safe usage of secure forum system 100, controlled environment 110 and forum facilitator 120 have complete control over user rules.

In some embodiments, forum facilitator 120 also includes components for analyzing potential communications that are to be posted on any forum or sub-forum associated with a controlled environment. In some embodiments, the analysis of the communications is based on the rules provided by controlled environment 110 which can specify, for example, what types (e.g., text, video, or audio) of communications are allowed or prohibited from being posted and the content of communications that can or cannot be posted.

Forum facilitator 120 is discussed in additional detail with respect to FIG. 2 below.

In some embodiments, monitoring center 130 includes database 132 and administrative application 134. Monitoring center 130 is associated with controlled environment 110 and, in some embodiments, coordinates with forum facilitator 120 to ensure that registered users comply with policies for using the secure forum and to store all communications posted in the secure forum. In some embodiments, monitoring center 130 is implemented as part of a component of forum facilitator 120. As previously explained, secure operation of the forum is important to prevent misuse by residents of controlled environment as well as outsiders who may seek to aid such residents. Monitoring center 130 includes a database 132 for storing all communications posted to the secure forum and an administrative application 134 that will analyze all stored communications to detect information related to each registered user and any patterns of communication that may indicate criminal activity being planned.

Database 132 includes any number of databases and/or servers, and stores and organizes data in a relational database. Database 132 runs a database management system, such as MySQL™, to provide an example. In some embodiments, analysis by administrative application 134 occurs in real-time as communications are posted to secure forum or sub-forum. In other embodiments, analysis occurs on stored communications in database 132. Administrative application 134 reports the results of such analysis to controlled environment 110. Database 132 will store all communications posted to a forum even if the registered user deletes the posted communication from the forum. In other words, while the posted communication is deleted and no longer viewable by other registered users in the forum, the posted communication remains accessible in database 132 to controlled environment 110.

In some embodiments, service providers 140 include medical services 142, educational services 144, and media services 146. Service providers 140 are to be approved by controlled environment 110 for participating in the secure forum and communicating with residents in controlled environment 110. In some embodiments, forum facilitator 120 is given permission my controlled environment 110 (e.g., in the forum of a rule provided by controlled environment 110) to analyze communications posted by residents and can proactively communicate with service providers 140 to provide services to residents based on the analyzed communications. In some embodiments, controlled environment 110 assign service providers 140 specific identifiers and/or login information to allow them to register and participate within the secure forum. Jurisdictions have an interest in ensuring the privacy of its residents and so jurisdictions are given the option to pre-approve which services can be provided to its residents.

When service providers 140 communicate directly with residents of controlled environment 110, for example, in response to an analyzed posted communication in the secure forum or sub-forum, forum facilitator 120 generates a private sub-forum between the resident and the service provider that allows the provider to communicate directly with the resident. Service providers 140 can be given access to the analyzed posted communication. In some embodiments, forum facilitator 120 or monitoring center 130 are responsible for selecting a service provider from service providers 140 based on the analyzed posted communication. As with the secure forum and its sub-forums, monitoring center 130 and/or forum facilitator 120 monitor interactions and communications that take place within the private sub-forum subject to any restrictions such as doctor-patient confidentiality.

In some embodiments, forum facilitator 120 performs analysis of posted communications and provides recommendations of services from service providers 140 based on the analysis. For example, a resident of controlled environment 110 may post in a sub-forum that includes other registered users such as the resident's friends or family complaining about a pain or other medical ailment. In response to an analysis of the posted communication and, in some embodiments, other communications posted by the resident in response to the original posted communication, forum facilitator 120 contacts an appropriate medical provider in medical services and facilitates communication between the resident and the medical provider. In some embodiments, this communication occurs as part a generated sub-forum with the resident and the medical provider as the only registered users.

In some embodiments, medical services 142 is implemented as a server system or cloud-based computing system that is configured to provide medical information between a medical service provider (e.g., a doctor) and residents of controlled environment 110. Like other registered users of the secure forum, any providers of medical services 142 are to be registered with forum facilitator 120 and also submit requests for signing into a secure forum or sub-forum. In order to protect the security of secure forum system 100, such providers also obtain approval from forum facilitator 120 or authorized personnel of controlled environment 110 of any medical providers (e.g., doctors) that will be providing medical services 142 to residents. For example, forum facilitator 120 or monitoring center 130 performs background checks of any providers before the providers are granted access to secure forum system 100.

In some embodiments, educational services 144 is implemented as a server system or cloud-based computing system that is configured to provide educational information between an educational service provider (e.g., an online university) and residents of controlled environment 110. Like other registered users of the secure forum, any providers of educational services 144 are to be registered with forum facilitator 120 and also submit requests for signing into a secure forum or sub-forum. As with medical services 142, in order to protect the security of secure forum system 100, educational providers also obtain approval from forum facilitator 120 or authorized personnel of controlled environment 110 before being able to provide educational services 144 to residents. For example, forum facilitator 120 or monitoring center 130 performs background checks of any providers before the providers are granted access to secure forum system 100. Educational services 144 include streaming lectures, electronic textbooks and/or resources, and on-line courses.

In some embodiments, media services 146 is implemented as a server system or cloud-based computing system that is configured to provide media information between a media service provider (e.g., video streaming service) and residents of controlled environment 110. Any providers of media services 146 are to be registered with forum facilitator 120 and also submit requests for signing into a secure forum or sub-forum. In order to protect the security of secure forum system 100, media providers also obtain approval from forum facilitator 120 or authorized personnel of controlled environment 110 before being able to provide any media services 146 to residents. For example, forum facilitator 120 or monitoring center 130 approve any media (e.g., movies, music) that are to be provided by providers before the providers are granted access to secure forum system 100.

Medical services 142, educational services 144, and media services 146 are only depicted in FIG. 1 as part of service providers 140 for simplicity. It is understood that service providers 140 includes any provider that provides or delivers services (approved by controlled environment 110) to residents of controlled environment 110 through forum facilitator 120. For example, other types of services providers 140 includes but is not limited to legal services, physical therapy services, and self-help services.

In some embodiments, outside environment 150 includes computing devices that allow for outsiders to participate in secure forum system 100. Computing devices include but are not limited to mobile telephone 151 and kiosk 152.

Exemplary Forum Facilitator Device

Figure 2:
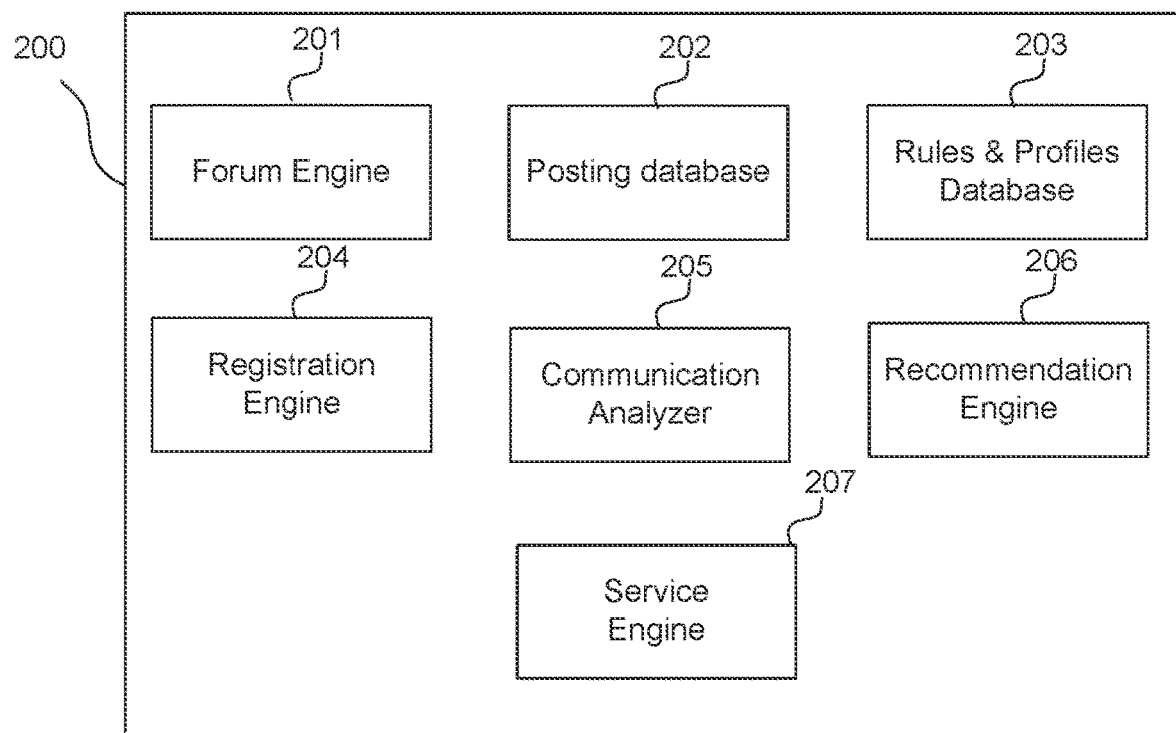
FIG. 2 illustrates a block diagram of an exemplary forum facilitator device for use in the exemplary secure forum system of FIG. 1, according to embodiments of the present disclosure.

FIG. 2 illustrates a block diagram of an exemplary forum facilitator 200 for use in the exemplary secure forum system of FIG. 1, according to embodiments of the present disclosure. Forum facilitator 200 represents an exemplary embodiment of forum facilitator 120 as described in FIG. 1. In some embodiments, forum facilitator 200 includes forum engine 201, posting database 202, rules and profiles database 203, registration engine 204, communication analyzer 205, recommendation engine 206, and service engine 207. In some embodiments, forum facilitator 200 is implemented as a cloud-based computing system.

Forum engine 201 is a component that creates secure forums and sub-forums based on rules associated with controlled environment 110. As previously described, forums differ from other forms of communication such as email or text messages in that multiple users may be part of a forum (or sub-forum), the users are to be registered and approved for posting communications on the forum, and communications are not delivered directly to any user but are hosted and stored at forum facilitator 200 (e.g., in posting database 202). In order to control communications that are posted and users with whom its residents communicate, controlled environment 110 submits rules (that, in some embodiments, are stored in rules and profiles database 203) that control the creation and monitoring of forums and sub-forums. As previously discussed, forums are generally considered "public" conversations and open to any registered user of secure forum system 100 while sub-forums are generally considered "private" conversations and restricted to specific registered users. In some embodiments, forums are limited to residents of controlled environment; in other words, outsiders or service providers are not allowed to view or post communications within forums. This is a safety concern to prevent residents of controlled environment 110 from communicating with or otherwise being able to contact outsiders with whom they are not allowed communication. Because they are "private" and have restricted access, sub-forums allow forum facilitator 200 to control which registered users are allowed to view and post communications with certain residents.

Both forums and sub-forums can be limited to specific topics for conversations. For example, a resident may request forum engine 201 to generate a forum directed to discussing safety issues about controlled environment 110 where the forum is available to all residents of controlled environment 110 who are also registered users. As another example, a resident may request forum engine 201 to generate a sub-forum also directed to discussing safety issues but can also request limiting the users who can post or view communications in the sub-forum. In some embodiments, a forum includes a plurality of other sub-forums where the sub-forums include only those registered users who have been invited and have been approved (e.g., through a rule) to join the sub-forum.

In some embodiments, forum engine 201 creates forums and sub-forums specific to controlled environment 110 upon receiving requests from registered users and based on analysis of any applicable rules provided by controlled environment 110. For example, controlled environment 110 submits rules specific to each resident, rules specific to topics, and rules specific to outsiders that can participate in forums. If forum engine 201 is linked with other controlled environments, in some embodiments, forum engine 201 generates forums and sub-forums specific the other controlled environments and maintains a separation between forums/sub-forums associated with different controlled environments. In some embodiments, based on rules provided by each controlled environment, forum engine 201 generates joint forums/sub-forums that allow residents from multiple controlled environments to participate in in a forum from across the different controlled environments.

Forum engine 201 manages operations of forums and sub-forums for controlled environment 110 by executing rules provided by controlled environment 110. These rules include resident rules, posting rules, and outsider rules. Rules allows controlled environment 110 to control the operations and management of forums and sub-forums by specifying permitted and restricted actions that can be performed by residents and outsiders.

Resident rules include rules that are specific to an individual resident and rules that apply to groups of residents (e.g., all residents in controlled environment). In some embodiments, resident rules specific to each resident describe the permissions and/or restrictions for each resident in controlled environment. Rules include but are not limited to blacklist rules that prevent residents from registering at all, whether a resident is permitted to generate a sub-forum, a list of contacts including outsiders with whom a resident is able to communicate, a list of contacts including outsiders with whom a resident is restricted from communicating, and restricted or permitted actions that can be performed by residents. In some embodiments, controlled environment 110 updates resident rules in order to update actions that can be performed by the resident; for example, controlled environment 110 updates a resident rule that is implemented by forum facilitator for suspending from secure forum system 100 for a period of time a resident who violates any posting rules. If resident rules permit a resident to communicate with a contact, the resident may view posted communications by the contact, the contact may view posted communications by the resident, and the both the resident and contact may receive notifications when the other has posted any communications on a forum or sub-forum (if one or the other is permitted access to the sub-forum).

In some embodiments, posting rules specific to topics and/or posted communications describe permitted and/or restricted topics that form the basis of forums and sub-forums. For example, residents cannot request creation of a forum or sub-forum directed toward restricted topics or post communications that are considered to violate any of the rules provided by controlled environment 110. In some embodiments, posting rules include prohibited keywords (e.g., profanity) as well as prohibited images to prevent nudity or prohibited content from being posted. In this regard, communications analysis (discussed further below) includes visual analysis of posted communications that include images or videos.

Outsider rules include rules that are specific to an individual outsider and rules that apply to groups of outsiders (e.g., all medical service providers, all service providers). In some embodiments, outsider rules specific to outsiders describe permissions and/or restrictions for outsiders such as persons who are not residents of controlled environment 110 and service providers 140. These rules provide permitted and restricted actions that can be performed by outsiders in forums and sub-forums associated with controlled environment.

In some embodiments, forum engine 201 also performs authentication functions when receiving requests from users to sign into secure forum system 100. Forum engine 201 receives authentication information from residents, outsiders, and service providers to sign into secure forum system 100. Authentication information can include but is not limited to at least one of a username and password data, challenge questions, challenge answers, biometric data, device data such as make and model of a communication device, and/or location data. Biometric data includes one or more of a finger print, a hand print, a voice sample, an iris or retinal sample, a facial image of the user (2D or 3D), a gait identification, a hand geometry, a signature identification, an infrared camera identification, or any other biometric as deemed appropriate.

Posting database 202 is a component that stores all posted communications in every forum and sub-forum. Notably, while posted communications can be deleted by the original poster and such deleted communications will no longer be viewable, controlled environment 110 will always be able to see any data/information that was posted to the forum and sub-forum at any time regardless of deletion. Posting database 202 allows forums and sub-forums to be mined for information related to residents of controlled environment 110 and determination as to whether any criminal or otherwise illicit activity is taking place or is being planned. Any analysis of posted communications in posting database will be reported on a scheduled basis to monitoring center 130 and/or controlled environment 110.

Rules and profiles database 203 stores rules and profiles associated with controlled environment 110 and registered users, such as residents of controlled environment 110 and outsiders, of secure forum system 100. In addition to rules discussed above with respect to forum engine 201, controlled environment 110 and/or monitoring center 130 provide other rules including registration rules, analysis rules, and recommendation rules. Profiles are generated for each registered user in secure forum system 100. Profiles include information and rules specific to each registered user including notification rules (e.g., contacts to be notified when the registered user posts a communication).

Registration engine 204 operates based on registration rules provided by controlled environment 110 and controls who, including residents of controlled environment 110, outsiders, and services providers 140 can register as a user in secure forum system 100. For example, a rule provided by controlled environment 110 specifies the information that is required to be submitted as part of a registration request to forum facilitator 200. Examples of information include but are not limited to: legal name and address (which is to be verified by legal document such as a government issued identification document that is submitted (e.g., as a picture or scan) as part of the registration request), social security number, driver's license number, relationship to any residents of controlled environment 110, mailing address, phone number, email addresses, age, gender, occupation, education, and photo. Any or all information can be required by controlled environment 110 in order to (1) verify the identity of the user, (2) assess any potential issues between the user and other registered users, and (3) determine relationships between the user and other registered users.

Registration rules for residents of controlled environment 110 can require additional information such as but not limited to booking number is incarcerated, reason for incarceration—offense, duration of sentence, expected release date, mailing address, facility, jurisdiction, photo, age, gender, occupation, and education. In some embodiments, controlled environment 110 already has this information about each resident but may use the information provided in the registration request as a test as to whether residents can be trusted to use secure forum system 100 properly. For example, if a resident provides false information in a registration request (determined based on a comparison of the provided information and information stored in a database), the rule may specify that the resident is not allowed to register with the system.

In some embodiments, registration rules also specify whether a registered user has a private or public account with secure forum system 100. In some embodiments, public accounts will allow all postings to be viewed by all registered users and private accounts will be only viewable by invited registered users. For example, by default, all service providers 140 can have private accounts so they are not subject to harassment by residents of controlled environment 110; only residents invited by service providers 140 or approved by controlled environment 110 can communicate with and view posts associated with service providers 140 which allows controlled environment 110 to control and monitor which residents are communicating with a specific service provider.

In some embodiments, registration rules also specify whether manual or automatic approval of the registration information is allowed. In other words, controlled environment 110 can provide a registration rule that indicates whether certain registration information triggers manual review and approval by an authorized official (e.g., of controlled environment 110) or whether automatic approval is acceptable. In some embodiments, automatic approval includes determining whether the provided registration information (e.g., reason for incarceration, booking number) is sufficient to allow for automatic approval without having to route a registration request for manual approval.

Communication analyzer 205 operates based on analysis and posting rules provided by controlled environment 110. Communication analyzer 205 includes filters and parsers for analyzing text-based communications based on analysis and posting rules. Posting rules include rules specifying banned words and banned images from being posted on any forum or sub-forum. Communication analyzer 205 monitors and analyzes all posted communications either in real-time (e.g., as communications are posted) and/or on a schedule (e.g., every night). Analyzing includes performing visual analysis on posted images or videos and text based analysis of posted communications. Visual analysis can include performing object identification and biometric analysis of any posted images or videos. Object identification includes analyzing images or video frames to determine objects present in the posted image or video. Biometric analysis includes analyzing facial, retinal, and other visual features of users in the posted image or video to determine identities of any persons. Communication analyzer 205 coordinates with analysis rules to perform predetermined actions based on the analysis. For example, an analysis rule may trigger a notification when a posted communication is found to violate a posting rule. In some embodiments, the notification includes the posted communication, the identifier of the forum or sub-forum in which the posted communication is posted, and an identifier associated with the registered user who posted the communication. The trigger can be sent to an administrator who can confirm or deny the results of the analysis. Another example of an analysis rule is based on a determination of the registered user who posted the communication as determined based notification rules in the user's profile.

In some embodiments, communication analyzer 205 also coordinates with recommendation engine 206 to provide recommendations of services to residents of controlled environment based on the results of the communication analysis. Recommendation engine 206 operates based on recommendation rules and receives the results of analysis from communication analyzer 205. Recommendation rules allow recommendation engine 206 to categorize and identify subjects within the analysis provided by communication analyzer 205. For example, recommendation engine 206 determines, based on the analysis provided by communication analyzer 205, that a posted communication is related to a medical condition involving the registered user or a desire to learn more about a certain topic to continue the resident's rehabilitation efforts. In some embodiments, this determination is based on a keyword comparison of the analysis (e.g., selecting whether certain medical terms are used in the posted communication) or a manual inspection by authorized personnel of controlled environment 110. In some embodiments, an analysis rule can specify which posted communications should be forwarded to controlled environment 110 for further inspection and/or review by authorized personnel. For example, communication analyzer 205 may assess that a posted communication is related to a medical condition and recommendation engine 206 will determine that a medical provider from service providers 140 is capable of assisting the resident. Recommendation engine 206 will then form a recommendation based on this assessment and determination. Before transmitting the recommendation to the resident, the recommendation will be forwarded to controlled environment 110 for review and approval of the recommendation.

Services engine 207 is a component that facilitates the provisioning of services between service providers 140 and residents of controlled environment 110. Services engine 207 manages the billing and advertising of services rendered by any service providers 140 by interacting with, for example, accounts associated with residents in controlled environment 110. Accordingly, services engine 207 has access to both information of residents as well as information of service providers 140. Services engine 207 enables any service providers 140 to submit information about the service provider such as advertising information, billing information, and services information for approval by controlled environment 110. Once approved, services engine 207 stores the information for later retrieval. For example, in some embodiments, services engine 207 can deliver advertising information to a resident, such as through an email, chat message, or text based on the resident's posting activity on the forum. In some embodiments, services engine 207 receives information from communication analyzer 205 and uses the analyzed information to retrieve appropriate advertising to the resident.

Services engine 207 also coordinates appropriate billing of any services rendered by service providers 140. In some embodiments, services engine 207 utilizes the submitted billing information to determine the amount that a resident should be billed for any services. Examples of billing information include a rate per hour, a one-time service fee, or any other billing arrangements (e.g., monthly, weekly). In some embodiments, services engine 207 tracks the length of time that a resident and service provider spend in a sub-forum and uses the tracked time as the basis for determining a billing for the resident. As previously discussed, in some embodiments, services engine 207 is granted permission to access an account associated with the resident and can directly withdraw money in order to pay for the rendered service. In some embodiments, services engine 207 accesses an account associated with a resident prior to the rendering of a service and confirms that the resident has sufficient funds to pay for any services provided by a service provider. If the account does not have enough funds, services engine 207 can deny the provisioning of services and/or transmit a notification explaining the denial to the resident or another contact associated with the resident (e.g., a family member).

Although not depicted, it is understood that forum facilitator 200 also includes processor circuitry and communication interfaces. Processor circuitry includes one or more processors and memory. The number of processors can be scaled to match the number of simultaneous user connections desired to be supported by a secure forum system such as secure forum system 100 of FIG. 1. Processors control the operation of forum facilitator 200 and its components. In some embodiments, memory can be any well-known volatile and/or non-volatile memory that is removable and/or non-removable.

Communication interfaces of forum facilitator 200 includes one or more transceivers, transmitters, and/or receivers that communicate via a wireless interface, such as Wi-Fi interface, cellular interface, and Bluetooth interface. Wi-Fi interface includes a Wi-Fi transceiver that enables Wi-Fi communication between forum facilitator 200 and an external device that also has Wi-Fi capability such devices in controlled environment 110. Cellular interface which includes a cellular transceiver that enables cellular communication between forum facilitator 200 and an external device that has cellular capability such as cellular antenna. Bluetooth interface includes a Bluetooth transceiver that enables Bluetooth communication between forum facilitator 200 and an external device that also has Bluetooth capability.

Exemplary Secure Forum System Operation

Exemplary usage of secure forum system 100 and forum facilitator 200 in a controlled environment will be described with respect to FIGS. 3-4. The exemplary usage described in FIGS. 3-4 can be performed by processing logic that can comprise hardware (e.g., circuitry, dedicated logic, programmable logic, microcode, etc.), software (e.g., instructions executing on a processing device), or a combination thereof.

Figure 3:
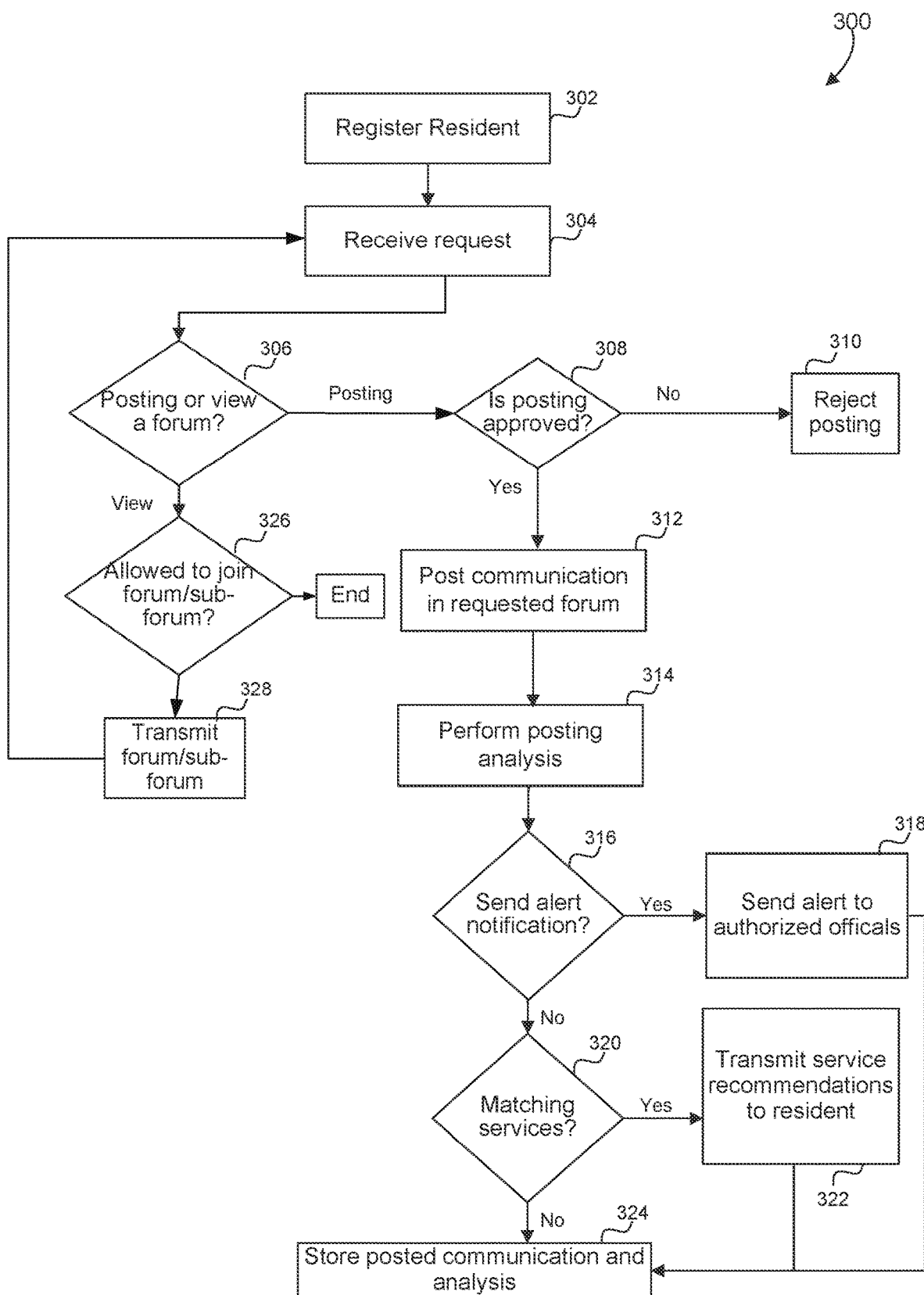
FIG. 3 illustrates a flowchart diagram of an exemplary method for providing forum communications by a resident in the exemplary secure forum system of FIG. 1, according to embodiments of the present disclosure.
Figure 4:
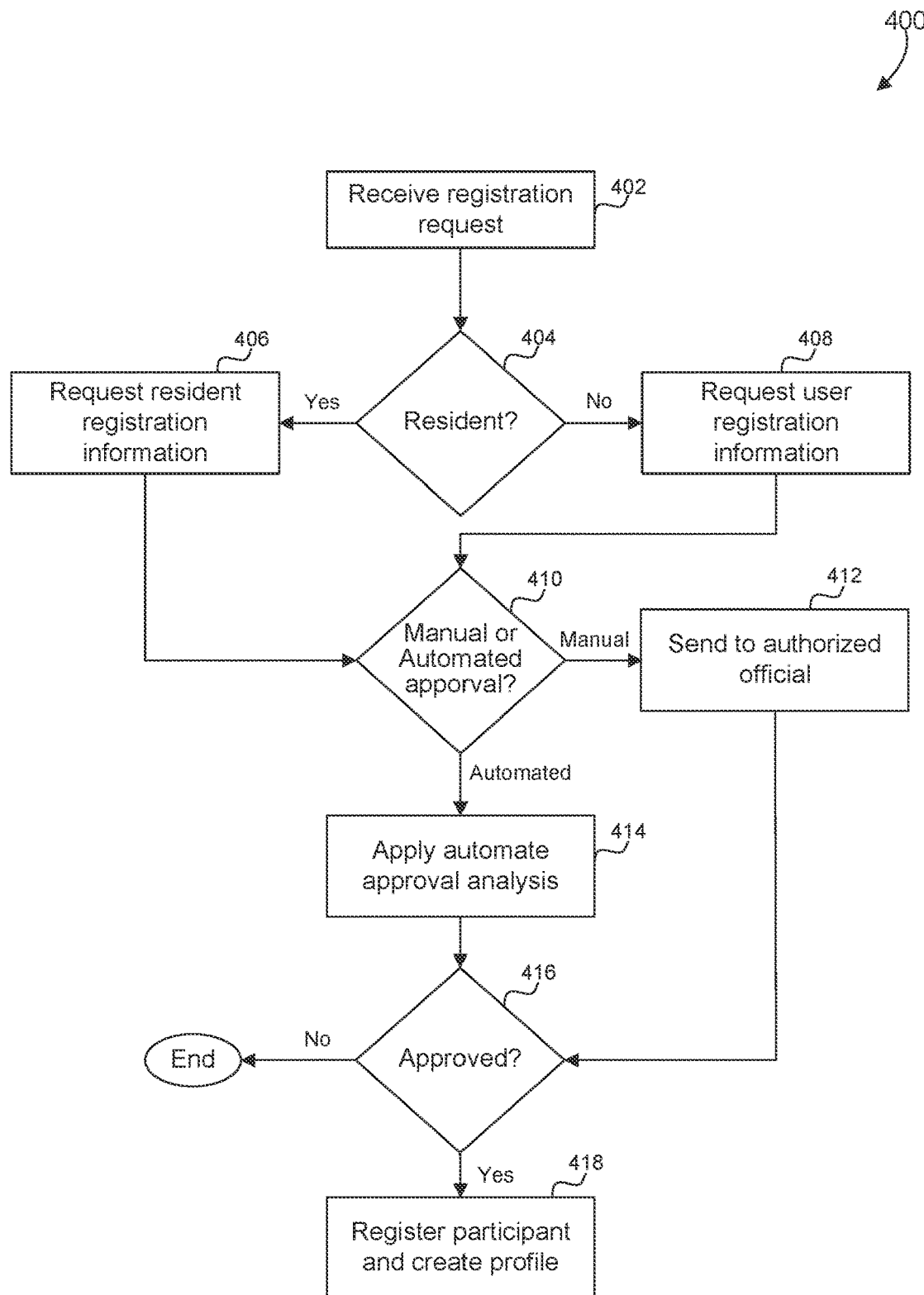
FIG. 4 illustrates a flowchart diagram of an exemplary method for executing a registration procedure in an exemplary secure forum system of FIG. 1, according to embodiments of the present disclosure.

For illustrative purposes, FIGS. 3-4 are described with respect to FIGS. 1-2 but are not limited to these example embodiments. The methods described in FIGS. 3-4 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIGS. 3-4, as will be understood by a person of ordinary skill in the art. Additionally, some steps can be combined with steps of methods from other figures and performed as a single step.

FIG. 3 illustrates a flowchart diagram of an exemplary method 300 for registering a resident, posting communications, and providing recommendations in an exemplary secure forum system 100 of FIG. 1, according to some embodiments of the present disclosure. In some embodiments, method 300 can be performed by forum facilitator 200.

In 302, forum facilitator 200 registers a resident based on a request received from a resident of controlled environment 110 to register with secure forum system 100. In some embodiments, the registration request is transmitted by a mobile device (e.g., mobile device 111) and includes an identifier associated with the resident and any information required by a registration rule provided by controlled environment 110. In some embodiments, forum facilitator determines whether to approve the registration request based on registration rules provided by controlled environment and rules associated with the resident identifier included in the request. After forum facilitator approves the registration request, the registered user is now allowed to join secure forum system 100.

In 304, forum facilitator 200 receives a request from the registered user. In some embodiments, the request is to post a communication in a forum or sub-forum or to view or join a forum or sub-forum. In some embodiments, the request includes an identifier associated with the registered user and an identifier of the forum or sub-forum in which the registered user is requesting to post a communication or to view a forum or sub-forum. In 306, forum facilitator 200 determines whether the request is for posting a communication or to view the forum or sub-forum.

If the request is for posting a communication, in 308, forum facilitator next determines whether the requested communication is approved for posting in the requested forum or sub-forum. In some embodiments, this determination is based on posting rules provided by controlled environment 110. Posting rules can specify, for example, whether a registered user is allowed to post a communication in a particular forum or sub-forum and the types of communications that can be posted including content that is permitted or restricted from being posted. In 310, forum facilitator 200 rejects the requested communication from posting on the basis of the rules provided by controlled environment 110.

In 312, when forum facilitator 200 determines that the communication may be posted in the requested forum or sub-forum, forum facilitator 200 posts the requested communication in the requested forum (or sub-forum). In 314, forum facilitator 200 analyzes the posted communication. In some embodiments, this analysis is performed in real-time as the communication is being posted. In some embodiments, this analysis takes place at a scheduled time and forum facilitator 200 analyzes posted communications as part of a batch processing. The analysis of the posted communication includes text analysis and if applicable, visual analysis of any images or videos.

In 316, forum facilitator 200 determines whether to send an alert notification. In some embodiments, this determination is based on notification rules provided by controlled environment 110. In some embodiments, forum facilitator 200 compares the analyzed posted communication with the notification rules to determine whether a notification is triggered on the basis of the analyzed posted communication. For example, if the analyzed posted communication reveals a threat of violence toward another resident of controlled environment 110 and controlled environment 110 has submitted a notification rule requesting any alert notifications upon the detection of certain keywords denoting violence, then forum facilitator 200 will transmit an alert notification in 318. In some embodiments, the notification rule also specifies contact information for authorized personnel of controlled environment 110 that are to be notified when the notification is triggered.

In 320, forum facilitator 200 also determines, on the basis of the posted communication analysis, whether a service recommendation should be transmitted to the registered user associated with the posted communication. In some embodiments, forum facilitator makes this determination on the basis of recommendation rules provided by controlled environment 110. In some embodiments, forum facilitator 200 compares the analyzed posted communication with the recommendation rules to determine whether any services match the analyzed posted communication. For example, if the analyzed posted communication includes keywords related to education or a desire to learn a specific topic and controlled environment 110 has submitted a recommendation rule indicating that specific keywords should be routed to an education service provider, then forum facilitator 200 will facilitate a communication between the education service provider and the registered user. In 322, forum facilitator 200 will transmit service recommendations to the resident who posted the communication where the service recommendations includes information regarding services provided by a service provider that was identified to be related to the analyzed posted communication. Transmission of service recommendations includes facilitating communications between the service provider and resident such as through the creation of a sub-forum in which the service provider and resident can transmit additional communications.

In 324, forum facilitator 200 stores the posted communication and the analysis of the posted communication.

In 326, if the request received in 304 is for joining or viewing a specific forum or sub-forum, forum facilitator 200 determines whether the resident is allowed to join or view the requested forum or sub-forum. In some embodiments, forum facilitator 200 performs this determination based on rules associated with the resident that are provided by controlled environment 110. For example, controlled environment 110 can restrict which forums and/or sub-forums that a resident can join or participate in by updating rules associated with that resident. In some embodiments, the rules include blacklists and whitelists selecting forums and/or sub-forums that the resident can or cannot join, contacts with whom the resident can or cannot communicate, and actions that the resident can or cannot perform within secure forum system 100. In 328, if the resident is determined to be allowed to join or view the forum or sub-forum, forum facilitator 200 transmits the forum or sub-forum for display on a device associated with the resident, such as mobile device 111.

FIG. 4 illustrates a flowchart diagram of an exemplary method 400 for registering a user within an exemplary secure forum system 100 of FIG. 1, according to embodiments of the present disclosure. In some embodiments, method 400 can be performed by forum facilitator 200.

In 402, forum facilitator 200 receives a registration request from a user. In some embodiments, the user is a resident of controlled environment 110 or an outsider to controlled environment 110 such as a person who is not a resident of controlled environment 110 or service providers 140. In 404, forum facilitator 200 determines whether the registration request is from an inmate or an outsider.

If an inmate, in 406, forum facilitator 200 requests the user provide resident registration information. In some embodiments, controlled environment 110 specifies the information that a resident is to provide in order to register with secure forum system 100 by providing registration rules specific to residents of controlled environment 110. In some embodiments, forum facilitator 200 will automatically retrieve the necessary information for a resident from a database. If not an inmate, in 408, forum facilitator 200 requests the user provide user registration information. In some embodiments, controlled environment 110 specifies the information that an outsider is to provide in order to register with secure forum system 100 by providing registration rules regarding outsiders to controlled environment 110.

In 410, forum facilitator 200 determines whether to perform manual or automated approval of the requested request. As previously discussed, this determination, in some embodiments, is based on registration rules provided by controlled environment 110. For example, a registration rule can specify that certain outsiders must be fully reviewed by a person prior being approved to join secure forum system. If manual approval is required, in 412, the registration request along with information associated with the user making the request and the provided registration information is transmitted to an authorized official of controlled environment 110.

In 414, if automated analysis is allowed, forum facilitator 200 performs an automated analysis of the registration information to determine whether to approve the registration request. In some embodiments, this automated analysis is based on detecting keywords in the registration and determining whether the keywords trigger any notification rules. For example, controlled environment 110 may include a rule prohibiting all residents with certain offenses from registering with the forum. Accordingly, forum facilitator 200 could deny any requests from users having such offenses included in their registration information.

In 416, forum facilitator 200 determines whether the registration request is approved. If yes, in 418, forum facilitator 200 registers the user and creates a profile associated with the user. The profile includes information specific to the user such as the user's preferences and account information. The profile also includes an identifier associated with the user that links to any rules provided by controlled environment 110 that are specific to the user.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 5:
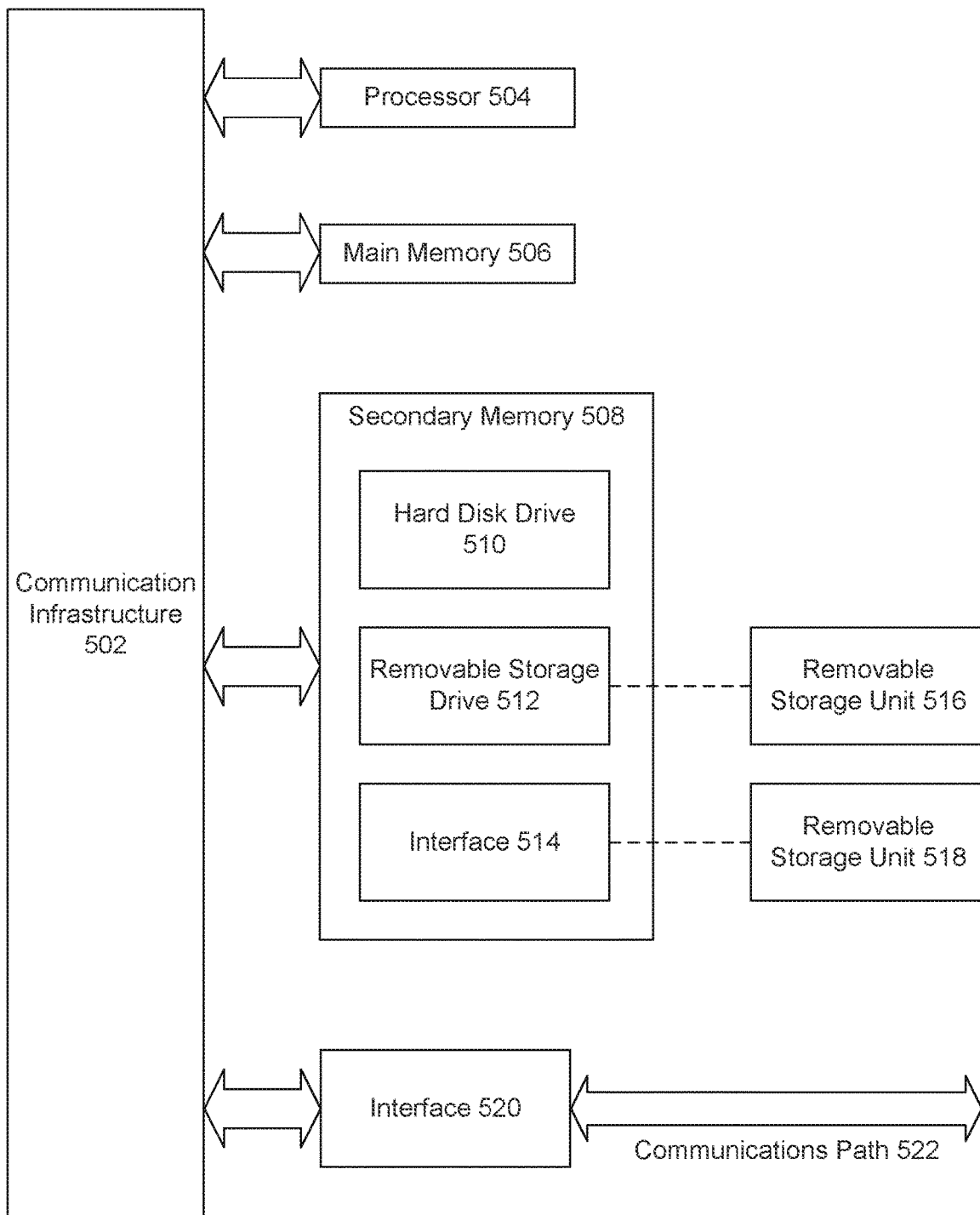
FIG. 5 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 3-4 can be implemented in the environment of one or more computer systems or other processing systems. An example of such a computer system 500 is shown in FIG. 5. One or more of the modules depicted in the previous figures can be at least partially implemented on one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for providing services over a secure forum accessible from within a controlled environment, comprising:
   receiving a request to post a communication in a first sub-forum of the secure forum, the request including a first identifier associated with a resident of the controlled environment and a sub-forum identifier associated with the first sub-forum;
   retrieving a rule associated with at least one of the first identifier and the sub-forum identifier;
   posting, based on the rule, the communication in the first sub-forum;
   performing a text-based analysis of content in the communication;
   identifying, based on the text-based analysis of the content in the communication and a recommendation rule, a service provider pre-approved by the controlled environment to communicate in the secure forum;
   generating a second sub-forum in the secure forum responsive to identifying the service provider; and
   registering the resident of the controlled environment and the service provider to provide access to the second sub-forum.

2. The method of claim 1, further comprising:
   generating an advertisement of the service provider; and
   delivering the advertisement to the resident of the controlled environment in at least one of an email or chat message.

3. The method of claim 1, further comprising:
   transmitting a recommendation that includes the service provider to a device associated with the resident of the controlled environment.

4. The method of claim 3, wherein content of the recommendation is based on the text-based analysis of the content in the communication.

5. The method of claim 1, wherein the communication includes text, the method further comprising:
   prior to posting the communication in the first sub-forum, performing the text-based analysis of the communication, wherein the text-based analysis includes determining whether the communication complies with a posting rule associated with the first sub-forum and the controlled environment.

6. The method of claim 1, further comprising:
   tracking a length of time that the resident of the controlled environment and the service provider signed into the first sub-forum; and
   determining a bill for the resident of the controlled environment based on the length of time.

7. The method of claim 1, further comprising:
   prior to receiving the first request, initiating a registration procedure associated with the resident of the controlled environment, wherein the registration procedure comprises:
      receiving information associated with the resident of the controlled environment, wherein the information includes at least one of a criminal offense associated with the resident of the controlled environment;
      retrieving a registration rule associated with the first sub-forum; and
      permitting a registration based on the information and the registration rule.

8. The method of claim 1, further comprising:
   receiving a second request to post a second communication, wherein the second request is from a device located outside of the controlled environment and that is associated with the service provider; and
   posting the second communication in the second sub-forum.

9. A forum facilitator device for operation within a controlled environment, comprising:
   a memory; and
   a processor coupled to the memory, the processor configured to perform operations for providing services over a secure forum accessible from within the controlled environment, the operations comprising:
      receiving a request to post a communication in a first sub-forum of the secure forum, the request including a first identifier associated with a resident of the controlled environment and a sub-forum identifier associated with the first sub-forum;
retrieving a rule associated with at least one of the first identifier and the sub-forum identifier;
posting, based on the rule, the communication in the first sub-forum;
performing a text-based analysis of content in the communication;
identifying, based on the text-based analysis of the content in the communication and a recommendation rule, a service provider pre-approved by the controlled environment to communicate in the secure forum;
generating a second sub-forum in the secure forum responsive to identifying the service provider; and
registering the resident of the controlled environment and the service provider to provide access to the second sub-forum.

10. The forum facilitator device of claim 9, the operations further comprising:
generating an advertisement of the service provider; and
delivering the advertisement to the resident of the controlled environment in at least one of an email or chat message.

11. The forum facilitator device of claim 9, the operations further comprising:
transmitting a recommendation that includes the service provider to a device associated with the resident of the controlled environment.

12. The forum facilitator device of claim 11, wherein content of the recommendation is based on the text-based analysis of the content in the communication.

13. The forum facilitator device of claim 9, wherein the communication includes text, the operations further comprising:
prior to posting the communication in the first sub-forum, performing the text-based analysis of the communication, wherein the text-based analysis includes determining whether the communication complies with a posting rule associated with the first sub-forum and the controlled environment.

14. The forum facilitator device of claim 9, the operations further comprising:
tracking a length of time that the resident of the controlled environment and the service provider signed into the first sub-forum; and
determining a bill for the resident of the controlled environment based on the length of time.

15. The forum facilitator device of claim 9, the operations further comprising:
prior to receiving the first request, initiating a registration procedure associated with the resident of the controlled environment, wherein the registration procedure comprises:
receiving information associated with the resident of the controlled environment, wherein the information includes at least one of a criminal offense associated with the resident of the controlled environment;
retrieving a registration rule associated with the first sub-forum; and
permitting a registration based on the information and the registration rule.

16. The forum facilitator device of claim 13, the operations further comprising:
receiving a second request to post a second communication, wherein the second request is from a device located outside of the controlled environment and that is associated with the service provider; and
posting the second communication in the second sub-forum.

17. A non-transitory computer-readable medium having instructions stored therein, which when executed by a processor, cause the processor to perform operations for providing services over a secure forum accessible from within a controlled environment, the operations comprising:
receiving a request to post a communication in a first sub-forum of the secure forum, the request including a first identifier associated with a resident of the controlled environment and a sub- forum identifier associated with the first sub-forum;
retrieving a rule associated with at least one of the first identifier and the sub-forum identifier;
posting, based on the rule, the communication in the first sub-forum;
performing a text-based analysis of content in the communication;
identifying, based on the text-based analysis of the content in the communication and a recommendation rule, a service provider pre-approved by the controlled environment to communicate in the secure forum;
generating a second sub-forum in the secure forum responsive to identifying the service provider; and
registering the resident of the controlled environment and the service provider to provide access to the second sub-forum.

18. The non-transitory computer-readable medium of claim 17, the operations further comprising:
generating an advertisement of the service provider; and
delivering the advertisement to the resident of the controlled environment in at least one of an email or chat message.

19. The non-transitory computer-readable medium of claim 17, the operations further comprising:
transmitting a recommendation that includes the service provider to a device associated with the resident of the controlled environment.

20. The non-transitory computer-readable medium of claim 19, wherein content of the recommendation is based on the text-based analysis of the content in the communication.

* * * * *